United States Patent
Takeshita et al.

(10) Patent No.: US 7,782,028 B2
(45) Date of Patent: Aug. 24, 2010

(54) DC-DC CONVERTER AND POWER SUPPLY APPARATUS

(75) Inventors: Junji Takeshita, Isehara (JP); Yukihiro Terada, Atsugi (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 233 days.

(21) Appl. No.: 11/729,264

(22) Filed: Mar. 27, 2007

(65) Prior Publication Data

US 2008/0013345 A1  Jan. 17, 2008

(30) Foreign Application Priority Data

Jul. 14, 2006 (JP) ............................. 2006-193522

(51) Int. Cl.
*G05F 1/577* (2006.01)
(52) U.S. Cl. ................... 323/267; 323/222; 323/259
(58) Field of Classification Search ............... 323/225, 323/265, 267, 268, 271, 282, 222, 224, 284, 323/285, 223, 259
See application file for complete search history.

(56) References Cited

U.S. PATENT DOCUMENTS

| | | | |
|---|---|---|---|
| 4,952,906 A | 8/1990 | Buyak et al. | |
| 5,155,430 A * | 10/1992 | Gulczynski | 323/224 |
| 5,412,308 A * | 5/1995 | Brown | 323/267 |
| 5,844,790 A * | 12/1998 | Jacobs et al. | 363/47 |
| 6,091,232 A * | 7/2000 | Criscione et al. | 323/222 |
| 6,307,357 B1 | 10/2001 | Botti et al. | |
| 6,756,772 B2 * | 6/2004 | McGinnis | 323/225 |
| 6,774,609 B2 * | 8/2004 | Heftman | 323/222 |
| 7,205,750 B2 * | 4/2007 | Murakami | 323/267 |
| 2004/0066179 A1 | 4/2004 | Wu et al. | |

FOREIGN PATENT DOCUMENTS

| | | | |
|---|---|---|---|
| GB | 2 283 136 A | | 4/1995 |
| JP | 5-56634 A | | 3/1993 |
| WO | WO 01/91273 A2 | | 11/2001 |

OTHER PUBLICATIONS

An Extended European Search Report dated Apr. 1, 2008, issued in a counterpart European Application.

* cited by examiner

*Primary Examiner*—Gary L Laxton
(74) *Attorney, Agent, or Firm*—Frishauf, Holtz, Goodman & Chick, P.C.

(57) ABSTRACT

A DC-DC converter includes: an inductance element and a rectifier element connected in series between a voltage input terminal to accept input direct current voltage and a first output terminal; a switching element connected between a connection node of the inductance element and the rectifier element and a reference potential point; and a controlling circuit to form a signal to control on/off of the switching element. The controlling circuit controls on/off of the switching element to control current through the inductance element, and a voltage applied to the voltage input terminal to accept the input direct current voltage is output via a second output terminal as a reference potential of a circuit at a latter stage, so that an output voltage is controllable from a lower to higher voltage than the input direct current voltage without switching step-up and step-down operations.

10 Claims, 3 Drawing Sheets

DC-DC CONVERTER AND POWER SUPPLY APPARATUS

BACKGROUND OF THE INVENTION

1. Field of the Invention

The present invention relates to a DC-DC converter to convert direct current voltage, particularly to a DC-DC converter which can perform step-up and step-down without switching step-up and step-down modes. For example, the present invention relates to a technique advantageous in applying to a DC-DC converter for supplying direct current power voltage to a charging apparatus which charges a secondary battery using a primary battery.

2. Description of Related Art

A secondary battery is used in portable electronic equipment such as a cell phone as a main power supply or auxiliary power supply. To charge the secondary battery of such portable electronic equipment, an AC-DC converter, called as an AC adaptor, to convert alternate current voltage into direct current voltage is generally used. Such AC-DC converter has a problem that the use thereof is limited to a certain location such as indoor. However, portable electronic equipment may run out of battery during outdoor use where there is no AC power supply. Thus, there has been a requirement for an apparatus which can charge a secondary battery at a location without an AC power supply.

The present inventors have hit on an idea of charging a secondary battery by use of a primary battery as a method to charge a secondary battery at a location without an AC power supply, and have considered the idea. There is given a problem of such method that a voltage of a primary battery decreases as charge proceeds. The inventors have considered that usage of a step-up DC-DC converter is effective in order to enable the charge of a secondary battery even when the charge has proceeded and a voltage of a primary battery has decreased.

On the other hand, according to a process to charge a secondary batter by use of a primary battery, it becomes necessary to charge a secondary battery when the secondary battery has discharged. Therefore, a voltage of a secondary battery is often lower than that of a primary battery in an early stage of the charge process, and thereafter, when the charge has proceeded to some extent, a voltage of the secondary battery becomes higher than that of the primary battery because an output voltage of the primary battery decreases and a voltage of the secondary battery has increases. Furthermore, it is required that current restriction is provided with a charging circuit so that a current value does not excess a certain value.

However, a normal step-up DC-DC converter as shown in FIG. 4 has a diode disposed in a forward direction with respect to an output terminal. Therefore, when a voltage of a secondary battery is lower than that of a primary battery, an output voltage is clamped to be a voltage lower by a voltage forwardly across the diode than an input voltage, as shown in FIG. 5A. As a result, it has been found that it is impossible to accomplish a function of controlling an output voltage and restricting an output current in a voltage range lower than a voltage of the primary battery only by applying the step-up DC-DC converter.

The present inventors considered that a DC-DC converter which once steps-up an output voltage of a primary battery and subsequently steps down it, i.e. a DC-DC converter comprising a step-up regulator at the former stage and a step-down regulator at the latter stage, is preferable for a DC-DC converter which is also effective in such situation.

A DC-DC converter of FIG. 2 is one using switching regulators for both the step-up regulators at the former stage and the step-down regulator at the latter stage. Although this DC-DC converter has an advantage of superior electric efficiency, it is problematic that there is difficulty in downsizing and producing at lower cost because regulators in the former and latter stages requires coils L1 and L2 and smoothing capacitors C1 and C2 respectively, which results a large number of parts.

A DC-DC converter of FIG. 3 is one using a switching regulator in a step-up circuit at the former stage and a series regulator in a step-down circuit at the latter stage. Although this DC-DC converter has an advantage of facility in reducing the number of parts and downsizing compared with the DC-DC converter of FIG. 2, it is still problematic that there is difficulty in efficiently downsizing and producing at lower cost because two control circuits are required.

A DC-DC converter disclosed in, for example, Japanese patent application publication laid-open No. 05-056634 can be given as an invention having a structure similar to a basic structure (relationship among a coil, diode and switching element) of a circuit of a DC-DC converter according to the present invention.

However, this earlier development is to combine a switching power supply with a charge pump so as to obtain an original stepped-up voltage and the double voltage thereof. This converter cannot output current at an output voltage continuously from lower to higher than an input voltage, unlike the present invention.

SUMMARY

The present invention has been made in consideration of the above problems. It is a major object of the present invention to provide a DC-DC converter which can be configured only by a step-up switching regulator and can be easily downsized and produced at lower cost.

It is another object of the present invention to provide a DC-DC converter which can be configured only by a step-up switching regulator and also has a current control function.

According to a first aspect of the invention, a DC-DC converter comprises: an inductance element and a rectifier element connected in series between a voltage input terminal to accept input direct current voltage and a first output terminal; a switching element connected between a connection node of the inductance element and the rectifier element and a reference potential point; and a controlling circuit to form a signal to control on/off of the switching element, wherein the controlling circuit controls on/off of the switching element to control current through the inductance element and a voltage applied to the voltage input terminal to accept the input direct current voltage is output to a second output terminal as a reference potential of a circuit at a latter stage, so that an output voltage is controllable from a lower to higher voltage than the input direct current voltage without switching step-up and step-down operations.

According to a second aspect of the invention, a DC-DC converter comprises: a reference voltage input terminal to accept a reference potential; a voltage input terminal to accept an input direct current voltage; a step-up circuit to step-up the input direct current voltage; a first output terminal to output a voltage stepped-up by the step-up circuit; a second output terminal to output the voltage input from the voltage input terminal to a circuit at a latter stage as a reference potential of the circuit at the latter stage; a smoothing capacitor connected between the first output terminal and the second output terminal, wherein the DC-DC converter outputs the voltage stepped-up by the step-up circuit from the first output terminal where an output voltage of the second output terminal is a reference, and wherein the step-up circuit comprises: an inductance element and a rectifier element connected in series between the voltage input terminal and the first output terminal; a switching element connected between a connection node of the inductance element and the rectifier element and the reference voltage input terminal; a controlling circuit to form a signal to control on/off of the switching element; and a current detection circuit to detect a level of an output current flowing through the first output terminal, and the controlling circuit turns off the switching element when the output current exceeds a predetermined level.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE PREFERRED EMBODIMENT

Hereinafter, an embodiment of the present invention is described with reference to the drawings.

Figure 1:
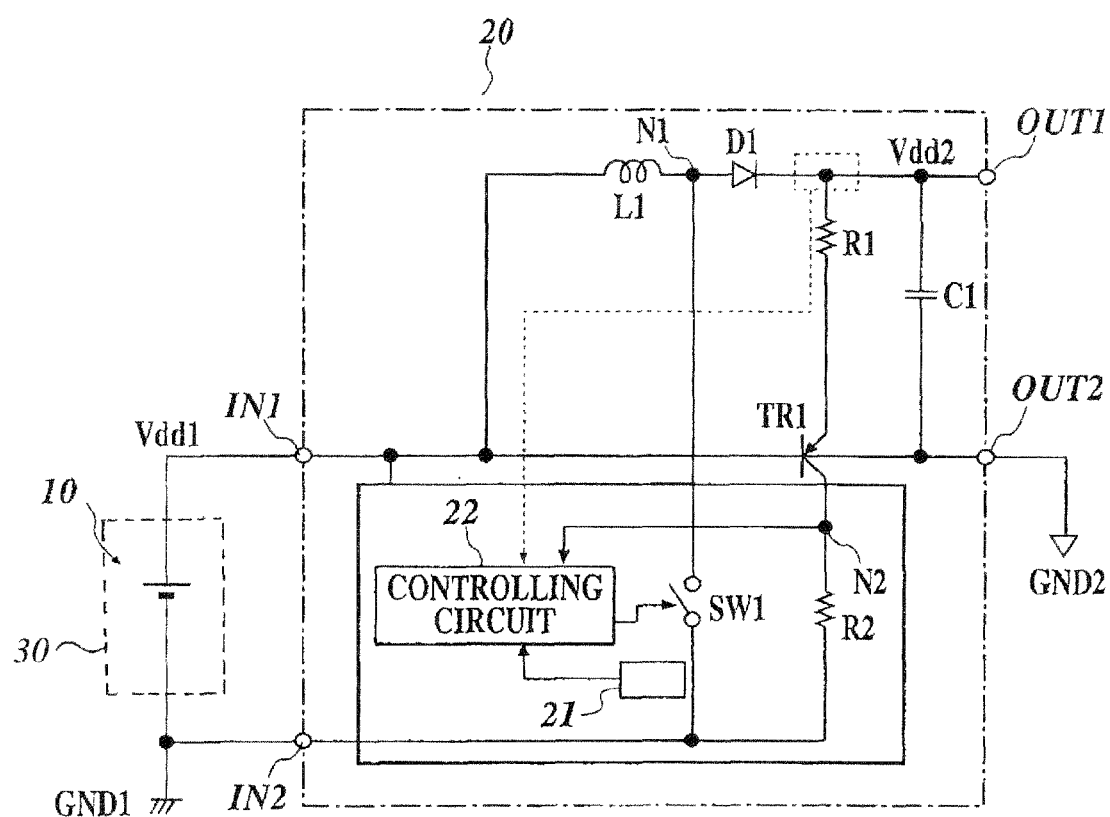
FIG. 1 is a circuit diagram showing one embodiment of a DC-DC converter to which the present invention is applied.
Figure 2:
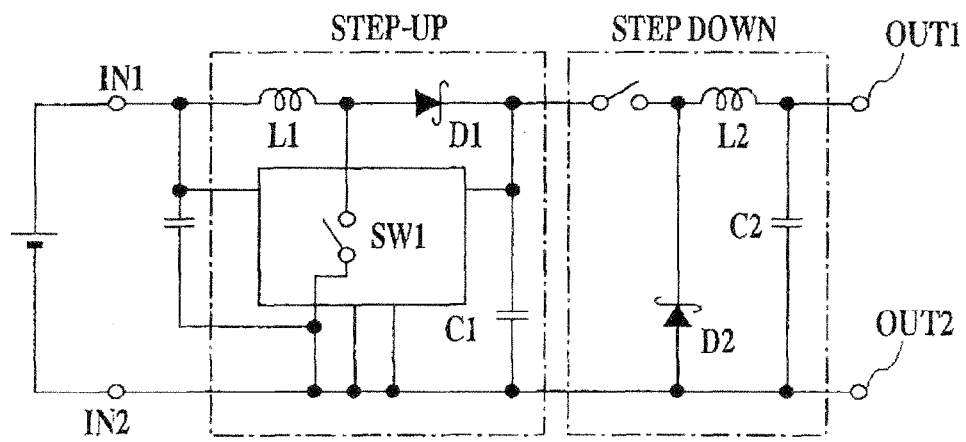
FIG. 2 is a circuit diagram showing an example of a DC-DC converter which was considered regarding the present invention.
Figure 3:
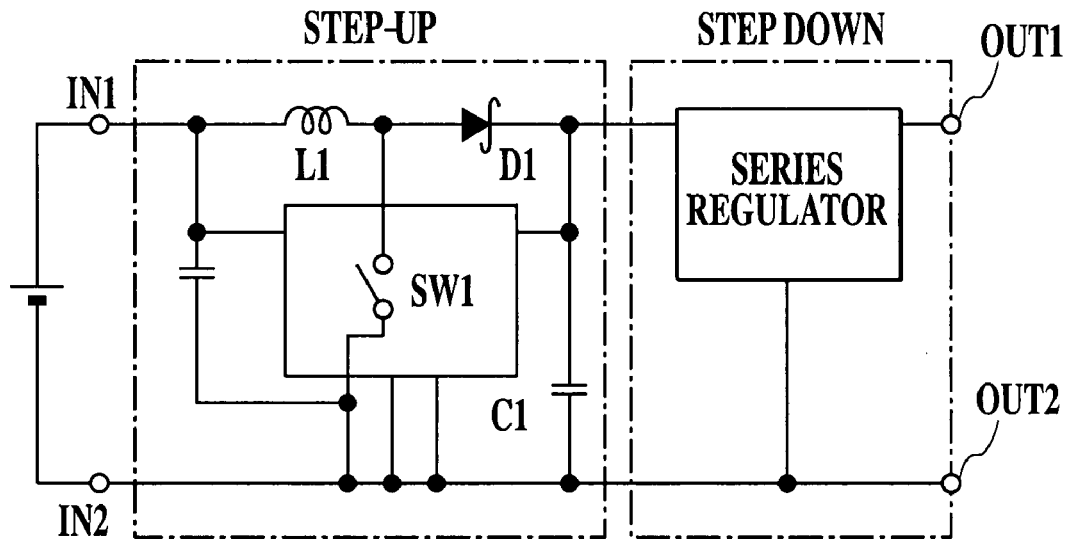
FIG. 3 is a circuit diagram showing an example of a DC-DC converter which was considered regarding the present invention.

FIG. 1 shows one embodiment of a DC-DC converter to which the present invention is applied. The DC-DC converter of the present embodiment is composed of a step-up switching regulator 20 to convert a direct current voltage Vdd1 from a primary battery 10 connected to input terminals IN1 and IN2 so as to generate a direct current voltage Vdd2 of different potential from Vdd1, and the like. The DC-DC converter is to output the direct current voltage Vdd2 stepped-up by the switching regulator 20 from an output terminal OUT1 and the direct current voltage Vdd1 of the primary battery 10 from an output terminal OUT2. A potential such as a ground potential (0V) is applied to the input terminal IN2 as a reference potential GND1 of the switching regulator 20. A charging circuit to charge a secondary battery such as a lithium battery is connected to the output terminals OUT1 and OUT2. The primary battery 10 may be a normal dry cell or a chargeable battery such as a lithium battery.

Accordingly, the charging circuit of the secondary battery which is a circuit at the latter stage to receive a voltage from the output terminals OUT1 and OUT2 can receive the stepped-up voltage Vdd2 where a voltage higher than the reference voltage GND1 of the switching regulator 20 by Vdd1 (GND1+Vdd1) is a reference voltage GND2. As a result, even when the direct current voltage Vdd1 of the primary battery 10 is 4.2 V for example, and the Vdd2 which has been stepped-up twice to 8.4 V by the switching regulator 20 is output from the output terminal OUT1, the voltage supplied to the circuit at the latter stage is 4.2 V.

The above switching regulator 20 comprises a coil L1 as an inductance element and a diode D1 as a rectifier element connected in series between the input terminal IN1 and output terminal OUT1; a smoothing capacitor C1 connected between a cathode terminal of the diode D1 and the output terminal OUT2; and a switching element SW1 connected between a connection node N1 of the coil L1 and the diode D1 and the reference potential GND1, composed of a transistor such as a MOSFET (insulated gate field-effect transistor).

The switching regulator 20 also comprises a current detector 21 to detect a current through the switching element SW1; a bleeder resistance R1, a PNP bipolar transistor TR1 and a bleeder resistance R2 connected in series between a cathode terminal of the diode D1 and reference potential GND1; and a controlling circuit 22 to control on/off of the switching element SW1 based on a current value detected by the current detector 21 and a voltage (potential at node N2) divided by the bleeder resistances R1 and R2.

The PNP bipolar transistor TR1 is off when the switching regulator 20 does not activate, so as to prevent a current from flowing through the bleeder resistance R1 and R2 and thus the primary cell 10 is discharged. That is, when there is no transistor TR1, a current from a positive terminal (+) of the primary battery 10 flows to the reference potential GND1 through the coil L1, diode D1 and resistances R1 and R2. The transistor TR1 is provided in order to prevent this. When the switching regulator 20 is activated and the voltage Vdd2 at the output terminal OUT1 increases, the transistor TR1 is biased between its emitter and base in a forward direction, i.e. base potential becomes lower than emitter potential, so that the transistor TR1 is turned on and a current flows through the bleeder resistance R1 and R2. The values of the bleeder resistances R1 and R2 are determined so that the current through the bleeder resistances R1 and R2 is low, for example 1 μA.

In the present embodiment, the elements constituting the regulator 20 other than the coil L1, diode D1 and capacitor C1 are structured as a semiconductor integrated circuit (IC) on a semiconductor chip, and the coil L1, diode D1 and smoothing capacitor C1 are connected to external terminals of the IC as external elements.

The controlling circuit 22 controls on/off of the switching element SW1 based on the voltage obtained by dividing the output voltage Vdd2 by the bleeder resistances R1 and R2, so as to control the output voltage Vdd2 to be a predetermined potential. That is, the switching element SW1 is turned on so that a current flows through the coil L1 to accumulate energy, and when SW1 is turned off, the energy accumulated in the coil L1 is released and current flows in a direction to charge the smoothing capacitor C1 through a diode D3. Thus, the stepped-up voltage Vdd2 is generated and the output voltage is controlled by changing a time period of the switching element SW1 being on. Specifically, the time period of the switching element SW1 being on is made longer when the output voltage Vdd2 decreases, and the time period is made shorter when the output voltage Vdd2 increases, so that the voltage is controlled to be a predetermined value.

The controlling circuit 22 monitors a current through the switching element SW1, and turns off the switching element SW1 when the current flows more than a predetermined value. Thus, the controlling circuit 22 prevents the output current from being more than a predetermined value. The above current detector 21 can be composed of, for example, a sense resistance connected in series to the switching element SW1 and a comparator to compare a terminal voltage of the sense resistance with a predetermined reference voltage. The current detector 21 may be provided between the diode D1 and output terminal OUT1 as shown by dashed line in FIG. 1, and monitor current flowing toward the output terminal OUT1 so as to control the current.

Figure 4:
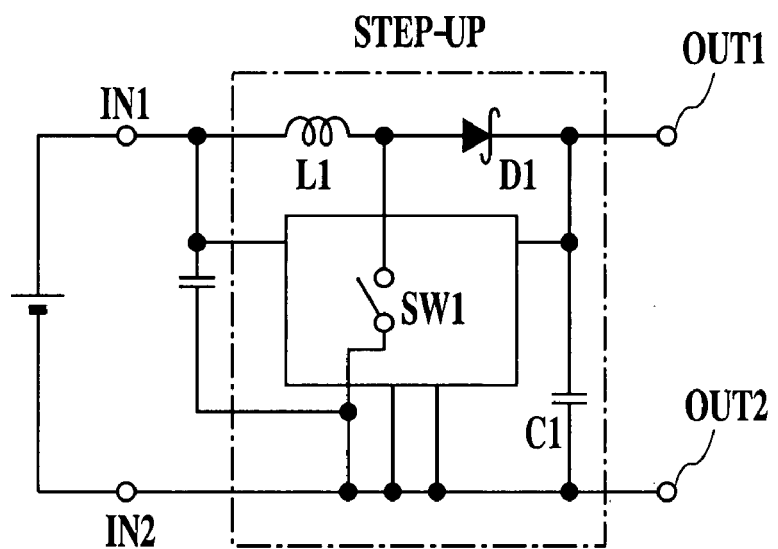
FIG. 4 is a circuit diagram showing an example of a normal step-up DC-DC converter.
Figure 5A:
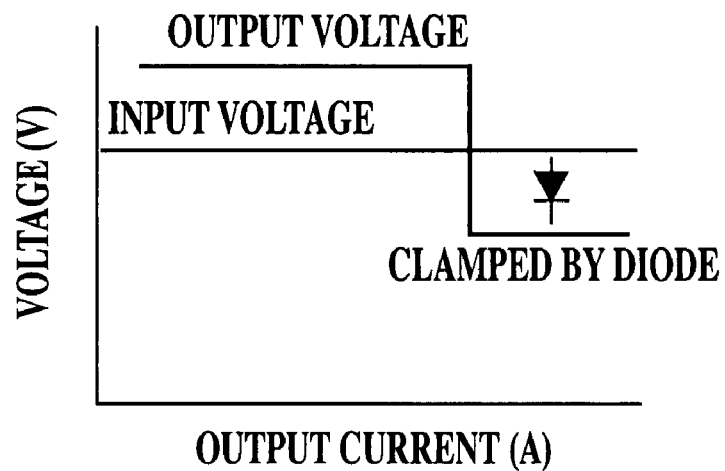
FIG. 5A is a volt-ampere plot of a normal step-up DC-DC converter.

The normal step-up DC-DC converter as shown in FIG. 4 has a diode disposed in a forward direction toward the output terminal OUT1. Thus, when a circuit at the latter stage is a charger of a secondary battery and a voltage of the secondary battery is lower than an output voltage of a primary battery, current flows to a diode D1 through a coil L1 even if a switching transistor SW1 is off. As a result, a function of restricting output current cannot be given to the converter. Also, because an output voltage is clamped to be a voltage lower by a forward voltage of the diode than an input voltage as shown in FIG. 5A, a function of controlling an output voltage in a range lower than a voltage of the primary battery cannot be given to the converter.

Figure 5B:
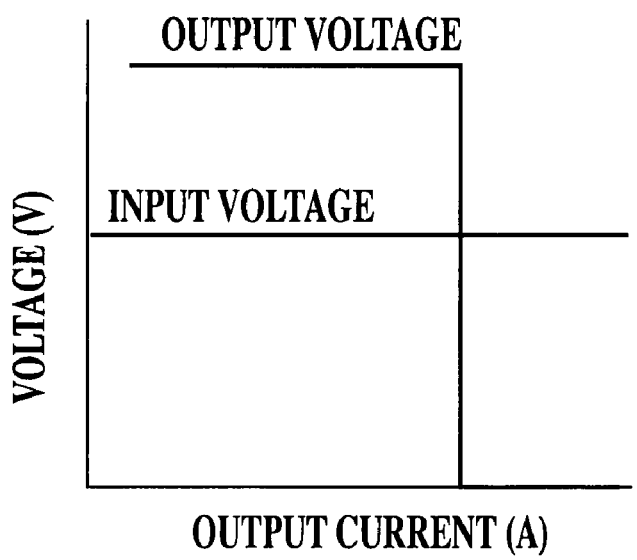
FIG. 5B is a volt-ampere plot of a present embodiment.

On the other hand, according to the switching regulator of the present embodiment, the voltage higher by the voltage of the primary battery than the reference potential GND1 of the regulator 20 is given as the reference potential GND2, and a voltage stepped-up higher than that is supplied to the charging circuit at the latter stage. Thus, the output voltage is not clamped by the forward voltage of the diode D1, because current does not flow to the diode D1 through the coil L1 when the switching transistor SW1 is off. As a result, it becomes possible to perform a reliable control of restricting the output current not to be a predetermined value or more, as shown in FIG. 5B.

When the DC-DC converter of the present embodiment is applied to a power supply for urgent charge of a cell phone, a possible configuration is that a substrate implemented with the switching regulator 20 is housed in a case or package to which a housing 30 to insert the primary battery 10 is provided. The power supply of such configuration has the advantage of being able to charge a secondary battery inside the cell phone, even when a cell phone runs out of battery at a location without an AC power supply or during electric power failure.

The present invention made by the present inventors are described specifically based on the embodiment thereof, though, it is not limited to the above embodiment. For example, it was described in the above embodiment that the elements other than the diode D1 and smoothing capacitor C1 are structured as the semiconductor integrated circuit (IC) on the semiconductor chip. However, the resistances R1 and R2, transistor TR1 and switching transistor SW1 may be structured as external elements. Especially, when the circuit outputs high current, it is desirable that the switching transistor is structured as an external element. The control circuit 21 may be composed of discreet parts. On the contrary, all the elements or all the elements other than the coil L1 can be formed on one semiconductor chip.

A p-channel MOSFET whose gate terminal is connected to the input terminal IN1 may be used instead of the PNP bipolar transistor TR1 which automatically stops current flowing through the resistances R1 and R2 when the step-up circuit does not activate.

In the above embodiment, the diode D1 is connected to the coil L1 in series. However, a transistor may be used instead of the diode D1 together with a control circuit which controls on/off of the transistor, and the transistor is controlled to perform synchronous rectification, i.e. to be on during a period corresponding to a period when a current flows through the diode D1 and to be off during a period when a current does not flow. By doing so, it becomes possible to reduce electric loss and obtain higher efficiency compared to the converter using a diode.

The above description is to describe an example where the present invention is applied to a switching regulator which converts a direct current voltage of a primary battery and supplies it to a charging apparatus to charge a secondary battery such as a lithium battery. However, the present invention is not limited thereto, and can be applied to a power supply of a system where an input direct current voltage varies widely or an output voltage varies from lower to higher than the input voltage.

According to the embodiments of the present invention, a DC-DC converter comprises: an inductance element and a rectifier element connected in series between a voltage input terminal to accept input direct current voltage and a first output terminal; a switching element connected between a connection node of the inductance element and the rectifier element and a reference potential point; and a controlling circuit to form a signal to control on/off of the switching element, wherein the controlling circuit controls on/off of the switching element to control current through the inductance element and a voltage applied to the voltage input terminal to accept the input direct current voltage is output to a second output terminal as a reference potential of a circuit at a latter stage, so that an output voltage is controllable from a lower to higher voltage than the input direct current voltage without switching step-up and step-down operations.

Specifically, the DC-DC converter comprises: a reference voltage input terminal to accept a reference potential; a voltage input terminal to accept an input direct current voltage; a step-up circuit to step-up the input direct current voltage; a first output terminal to output a voltage stepped-up by the step-up circuit; a second output terminal to output the voltage input from the voltage input terminal to a circuit at a latter stage as a reference potential of the circuit at the latter stage; a smoothing capacitor connected between the first output terminal and the second output terminal, wherein the DC-DC converter outputs the voltage stepped-up by the step-up circuit from the first output terminal where an output voltage of the second output terminal is a reference, and wherein the step-up circuit comprises: an inductance element and a rectifier element connected in series between the voltage input terminal and the first output terminal; a switching element connected between a connection node of the inductance element and the rectifier element and the reference voltage input terminal; a controlling circuit to form a signal to control on/off of the switching element; and a current detection circuit to detect a level of an output current flowing through the first output terminal, and the controlling circuit turns off the switching element when the output current exceeds a predetermined level.

The DC-DC converter comprising the above structure has an advantage in facility of downsizing and producing at lower cost, because the converter can be composed only by a step-up switching regulator and requires only one inductor element and control circuit. Furthermore, a current restriction function can be given to the converter because a current does not flow to the rectifier element even when a voltage of the circuit at the latter stage is low. Furthermore, it is possible to perform accurate voltage control because the output voltage is not clamped by the rectifier element. Furthermore, it is possible to obtain a DC-DC converter having high electric efficiency because the step-up circuit is single and electric loss is lower than that provided with a step-down circuit at the latter stage of the step-up circuit.

Preferably, the DC-DC converter further comprises a resistance element connected between the rectifier element and the first output terminal, wherein the current detection circuit detects the output current based on a voltage across the resistance element. Alternatively, the DC-DC converter may comprise a resistance element connected between the switching element and the reference voltage input terminal, wherein the current detection circuit detects the output current based on a voltage across the resistance element. By doing so, it becomes possible to perform accurate current control in a range of low output voltage and a current restriction control to stop the output current by turning off the switching element to stop a step-up operation when the output current exceeds a predetermined value.

Further, the DC-DC converter preferably comprises a resistance division circuit including two or more resistance elements connected in series between the switching element and the reference voltage input terminal, wherein the controlling circuit controls the switching element based on the current detected by the current detection circuit and a voltage divided by the resistance division circuit. By doing so, it becomes possible to perform accurate control of the output voltage as well as the current control.

Further, a switching transistor is preferably connected between the resistance elements constituting the resistance division circuit, and the switching transistor turns off when a voltage output from the first output terminal is a predetermined level or less. By doing so, it becomes possible to prevent a wasteful current flowing through the resistance constituting a resistance division circuit when the step-up operation stops. Here, the switching transistor is preferably a PNP bipolar transistor which accepts the voltage input to the voltage input terminal at a base terminal thereof. By using this element, the transistor automatically turns off when the output voltage decreases. Consequently, it is not necessary to generate a control signal separately, and the circuit can be simplified.

Further, the rectifier element or a transistor is preferably used a diode connected in a forward direction toward the first output terminal. When a diode is used as the rectifier element, the circuit can be simplified. When a transistor is used, electric efficiency can be improved by controlling the transistor to perform synchronous rectification.

According to another embodiment of the invention, a power supply comprises: the above-described DC-DC converter; and a battery housing to which a battery is to be loaded, the battery supplying the input direct voltage to be applied to the voltage input terminal. According to the power supply comprising such structure, even when a cell phone run out of energy at a location without an AC power source or during electric power failure, it becomes possible to charge a secondary cell inside the cell phone.

As described above, the invention has advantages of attaining a DC-DC converter which has a current restriction function and which can be composed only with a step-up switching regulator, can be easily downsized and produced at lower cost.

The entire disclosure of Japanese Patent Application No. 2006-193522 filed on Jul. 14, 2006, including description, claims, drawings and summary are incorporated herein by reference in its entirety.

Although various exemplary embodiments have been shown and described, he invention is not limited to the embodiments shown. Therefore, the scope of the invention is intended to be limited solely by the scope of the claims the follow.

What is claimed is:

1. A DC-DC converter comprising:
an inductance element and a rectifier element connected in series between a voltage input terminal to accept input direct current voltage and a first output terminal;
a switching element connected between a connection node of the inductance element and the rectifier element and a reference potential point, the switching element being directly connected to the connection node and the reference potential point; and
a controlling circuit to form a signal to control on/off of the switching element,
wherein the controlling circuit controls on/off of the switching element to control current through the inductance element, and a voltage applied to the voltage input terminal to accept the input direct current voltage is output via a second output terminal as a reference potential of a circuit at a latter stage.

2. A power supply comprising:
the DC-DC converter of claim 1; and
a battery housing to which a battery is to be loaded, the battery supplying the input direct current voltage to be applied to the voltage input terminal.

3. A DC-DC converter comprising:
a reference voltage input terminal to accept a reference potential;
a voltage input terminal to accept an input direct current voltage;
a step-up circuit to step-up the input direct current voltage;
a first output terminal to output a voltage stepped-up by the step-up circuit;
a second output terminal to output the voltage input from the voltage input terminal to a circuit at a latter stage as a reference potential of the circuit at the latter stage;
a smoothing capacitor connected between the first output terminal and the second output terminal,
wherein the DC-DC converter outputs the voltage stepped-up by the step-up circuit from the first output terminal referring to an output voltage of the second output terminal, and
wherein the step-up circuit comprises:
an inductance element and a rectifier element connected in series between the voltage input terminal and the first output terminal;
a switching element connected between a connection node of the inductance element and the rectifier element and the reference voltage input terminal, the switching element being directly connected to the connection node and the reference voltage input terminal;
a controlling circuit to form a signal to control on/off of the switching element; and
a current detection circuit to detect a level of an output current flowing through the first output terminal,
wherein the controlling circuit turns off the switching element when the output current exceeds a predetermined level.

4. The DC-DC converter according to claim 3, further comprising a resistance element connected between the rectifier element and the first output terminal, wherein the current detection circuit detects the output current based on a voltage across the resistance element.

5. The DC-DC converter according to claim 3, further comprising a resistance element connected between the switching element and the reference voltage input terminal, wherein the current detection circuit detects the output current based on a voltage across the resistance element.

6. The DC-DC converter according to claim 3, further comprising a resistance division circuit including two or more resistance elements connected in series between the switching element and the reference voltage input terminal, wherein the controlling circuit controls the switching element based on the current detected by the current detection circuit and a voltage divided by the resistance division circuit.

7. The DC-DC converter according to claim 6, further comprising:
- a switching transistor connected between the resistance elements constituting the resistance division circuit, wherein the switching transistor turns off when a voltage output from the first output terminal is a predetermined level or less.

8. The DC-DC converter according to claim 7, wherein the switching transistor is a PNP bipolar transistor which accepts the voltage input to the voltage input terminal at a base terminal thereof.

9. The DC-DC converter according to claim 3, wherein the rectifier element is a diode connected in a forward direction toward the first output terminal.

10. A power supply comprising:
the DC-DC converter of claim 3; and
a battery housing to which a battery is to be loaded, the battery supplying the input direct current voltage to be applied to the voltage input terminal.

* * * * *